(12) United States Patent
Wang (10) Patent No.: US 9,278,464 B2
(45) Date of Patent: Mar. 8, 2016

(54) MOLDING MACHINE FOR MAKING THERMOPLASTIC COMPOSITES

(71) Applicant: Shui Mu Wang, Taichung (TW)

(72) Inventor: Shui Mu Wang, Taichung (TW)

(73) Assignee: Chaei Hsin Enterprise Co., Ltd., Taichung (TW)

( * ) Notice: Subject to any disclaimer, the term of this patent is extended or adjusted under 35 U.S.C. 154(b) by 64 days.

(21) Appl. No.: 14/010,640

(22) Filed: Aug. 27, 2013

(65) Prior Publication Data

US 2015/0064300 A1    Mar. 5, 2015

(51) Int. Cl.

| | |
|---|---|
| *B29C 51/10* | (2006.01) |
| *B29C 70/34* | (2006.01) |
| *B29C 33/42* | (2006.01) |
| *B29C 33/02* | (2006.01) |
| *B29C 70/44* | (2006.01) |
| *B32B 38/06* | (2006.01) |
| *B30B 15/06* | (2006.01) |
| *B29C 33/10* | (2006.01) |
| *B29K 101/12* | (2006.01) |
| *B29L 31/00* | (2006.01) |
| *B29C 51/28* | (2006.01) |
| *B29C 51/38* | (2006.01) |
| *B29C 51/42* | (2006.01) |
| *B32B 37/00* | (2006.01) |
| *B32B 37/04* | (2006.01) |
| *B32B 37/26* | (2006.01) |

(52) U.S. Cl.
CPC .............. *B29C 33/42* (2013.01); *B29C 33/02* (2013.01); *B29C 33/424* (2013.01); *B29C 51/10* (2013.01); *B29C 70/44* (2013.01); *B30B 15/062* (2013.01); *B30B 15/064* (2013.01); *B32B 38/06* (2013.01); *B29C 33/10* (2013.01); *B29C 51/28* (2013.01); *B29C 51/38* (2013.01); *B29C 51/428* (2013.01); *B29C 2791/006* (2013.01); *B29K 2101/12* (2013.01); *B29L 2031/756* (2013.01); *B32B 37/0046* (2013.01); *B32B 37/04* (2013.01); *B32B 2037/268* (2013.01); *B32B 2437/00* (2013.01)

(58) Field of Classification Search
CPC   B29C 33/02; B29C 33/42; B29C 2043/3644; B29C 43/3642
USPC ............................. 425/385, 388, 389, 405.1
See application file for complete search history.

(56) References Cited

U.S. PATENT DOCUMENTS

| | | | | |
|---|---|---|---|---|
| 3,528,276 | A * | 9/1970 | Hedstrom et al. | 100/92 |
| 4,781,569 | A * | 11/1988 | Kinugasa et al. | 425/388 |
| 6,860,957 | B2 * | 3/2005 | Sana et al. | 264/258 |
| 8,329,085 | B2 * | 12/2012 | Kurtz et al. | 264/258 |

\* cited by examiner

*Primary Examiner* — Joseph S Del Sole
*Assistant Examiner* — Thukhanh T Nguyen
(74) *Attorney, Agent, or Firm* — Alan D. Kamrath; Kamrath IP Lawfirm, P.A.

(57) ABSTRACT

A molding machine for making thermoplastic composites contains: a machine frame, a platform, a heating device, a vacuum member, and a gas barrier film. The machine frame includes a working stage. The platform is mounted on the working stage and includes channels, a curved pattern portion and plural tiny holes which are arranged on the top surface of the platform. The plurality of tiny holes communicate with the channels. The platform also includes a connector fixed on one side thereof and communicating with the channels. The heating device is secured on a bottom end of the platform and heats a working material on the platform. The vacuum member is arranged in the machine frame and includes a pipe for coupling with the connector. The gas barrier film is flaky and covers the top surface of the platform.

8 Claims, 8 Drawing Sheets

MOLDING MACHINE FOR MAKING THERMOPLASTIC COMPOSITES

FIELD OF THE INVENTION

The present invention relates to a molding machine for making thermoplastic composites.

BACKGROUND OF THE INVENTION

A conventional molding machine for making thermoplastic composites contains a machine frame with an upper die, a lower die, and a heating device. The lower die has a plurality of curved pattern portions, and a thermoplastic film and a cloth material are cut and stacked on a top surface of the lower die. The heating device heats the thermoplastic film so that the thermoplastic film melts, and the upper die is covered on the cloth material and the thermoplastic film, thus pressing the cloth material and the thermoplastic film together.

However, the cloth material and the thermoplastic film cannot be pressed together tightly, and patterns on the thermoplastic film are not obvious.

The present invention has arisen to mitigate and/or obviate the afore-described disadvantages.

SUMMARY OF THE INVENTION

The primary objective of the present invention is to provide a molding machine for making thermoplastic composites capable of overcoming the shortcomings of the conventional molding machine for making thermoplastic composites.

To obtain the above objective, a molding machine for making thermoplastic composites provided by the present invention contains: a machine frame, a platform, a heating device, a vacuum means, and a gas barrier film.

The machine frame includes a working stage.

The platform is mounted on the working stage and includes a plurality of channels. The plurality of channels communicate with each other. The platform also includes a curved pattern portion and a plurality of tiny holes which are arranged on the top surface of the platform. A connector is fixed on one side of the platform and communicates with the plurality of channels. The plurality of tiny holes are in communication with the plurality of channels.

The heating device is secured on the platform and heats a working material on a top surface of the platform.

The vacuum means is arranged in the machine frame and includes a pipe for coupling with the connector of the platform.

The gas barrier film is flaky and covers the top surface of the platform.

DETAILED DESCRIPTION OF THE PREFERRED EMBODIMENTS

With reference to FIGS. 1-7, a molding machine for making thermoplastic composites according to a first embodiment of the present invention comprises: a machine frame 10, a platform 20, a heating device 30, a vacuum means 40, a pressing die 50, and a gas barrier film 60.

Figure 1:
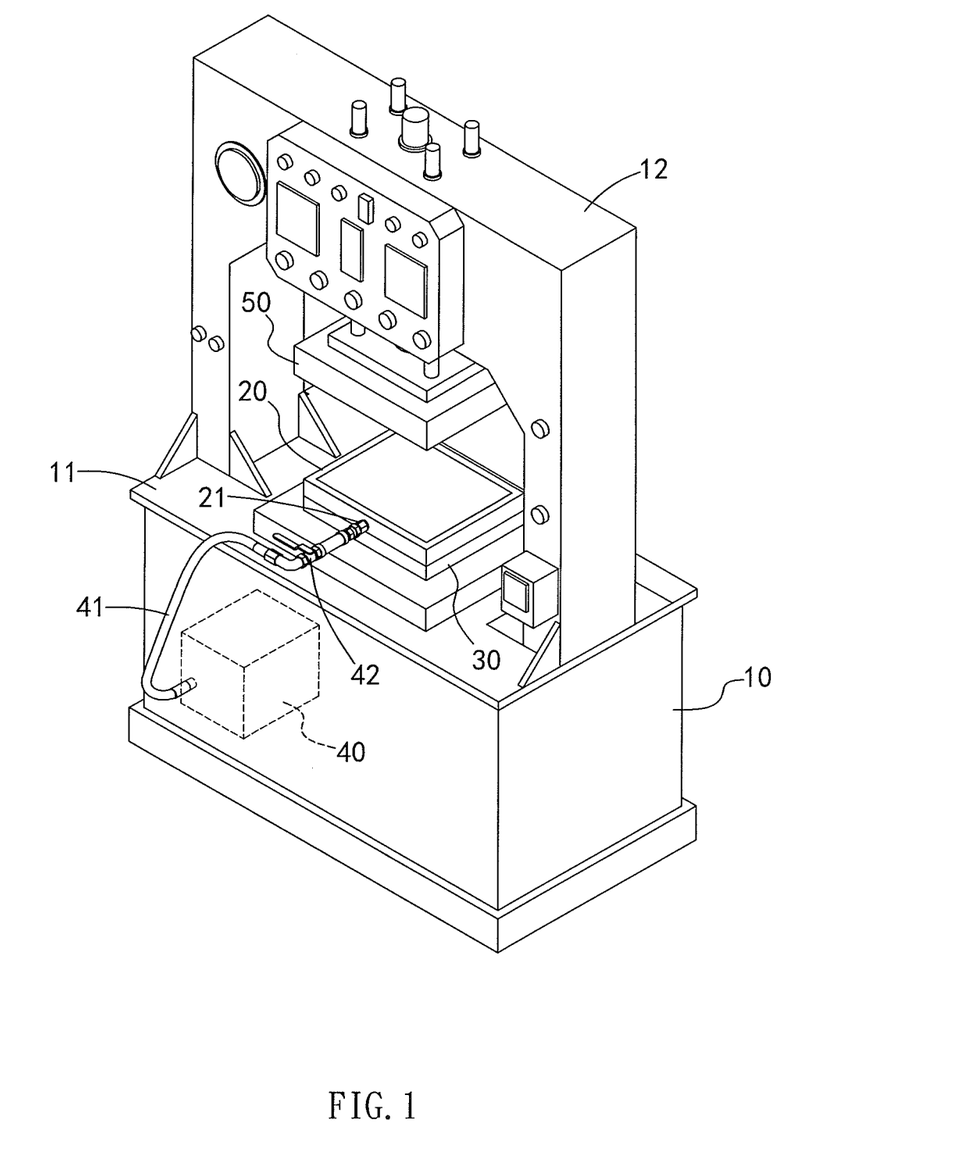
FIG. 1 is a perspective view showing the assembly of a molding machine for making thermoplastic composites according to a first embodiment of the present invention.
Figure 2:
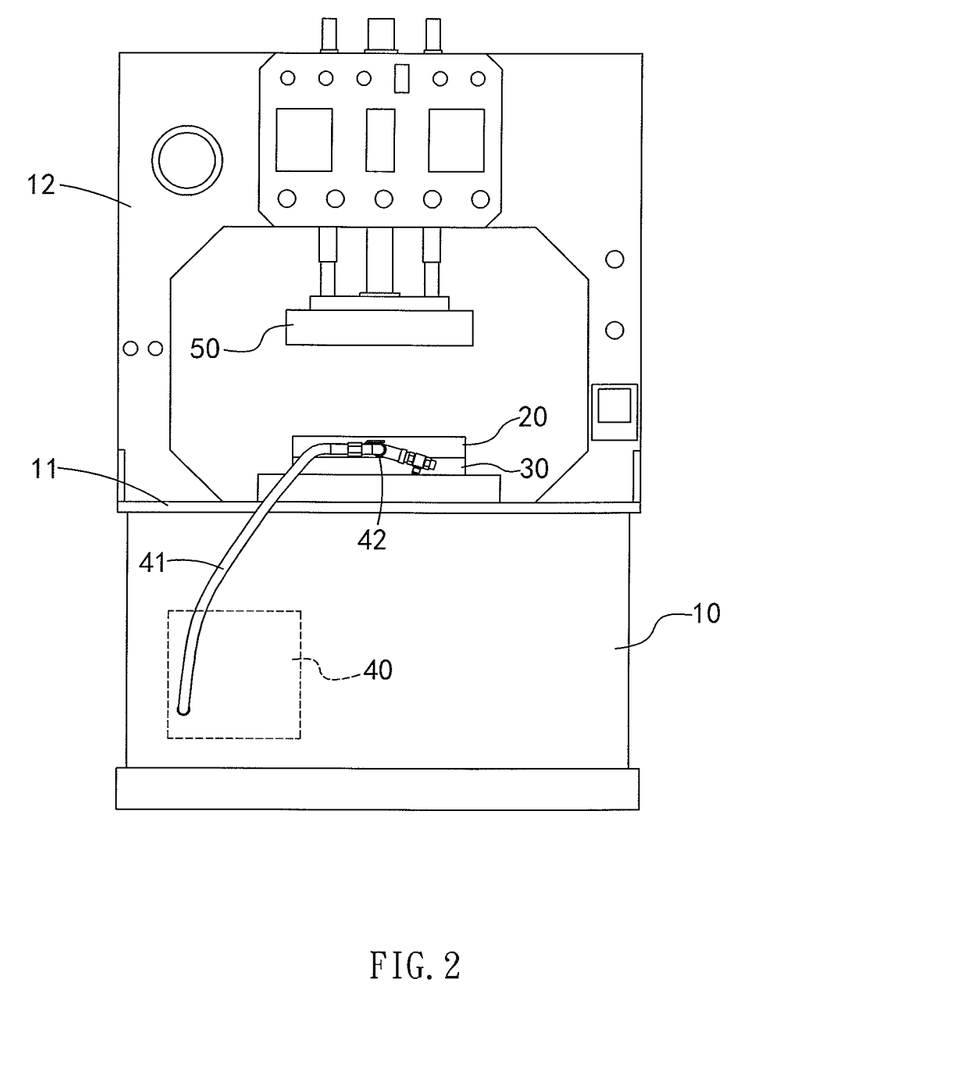
FIG. 2 is a side plan view showing the assembly of a platform of the molding machine for making thermoplastic composites according to the first embodiment of the present invention.

The machine frame 10 includes a working stage 11 and a C-shaped rack 12 disposed on the working stage 11.

The platform 20 is mounted on the working stage 11 and includes a connector 21 fixed on one side thereof.

The heating device 30 is secured on a bottom end of the platform 20 and heats a working material on a top surface of the platform 20.

The vacuum means 40 is arranged in the machine frame 10 and includes a pipe 41 for coupling with the connector 21 of the platform 20 and a control valve 42 defined at a connecting position of the pipe 41 and the connector 21 to control air extraction.

The pressing die 50 is movably disposed on the C-shaped rack 12 and moves to and presses the top surface of the platform 20. In this embodiment, the heating device 30 is mounted in the pressing die 50.

The gas barrier film 60 is flaky and made of rubber, silicone or plastic, and the gas barrier film 60 covers the top surface of the platform 20.

Figure 3:
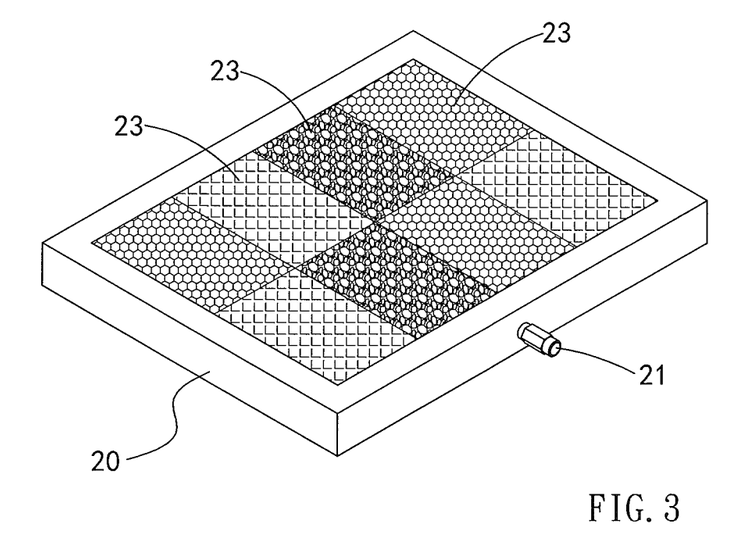
FIG. 3 is a perspective view showing the assembly of the platform of the molding machine for making thermoplastic composites according to the first embodiment of the present invention.
Figure 4:
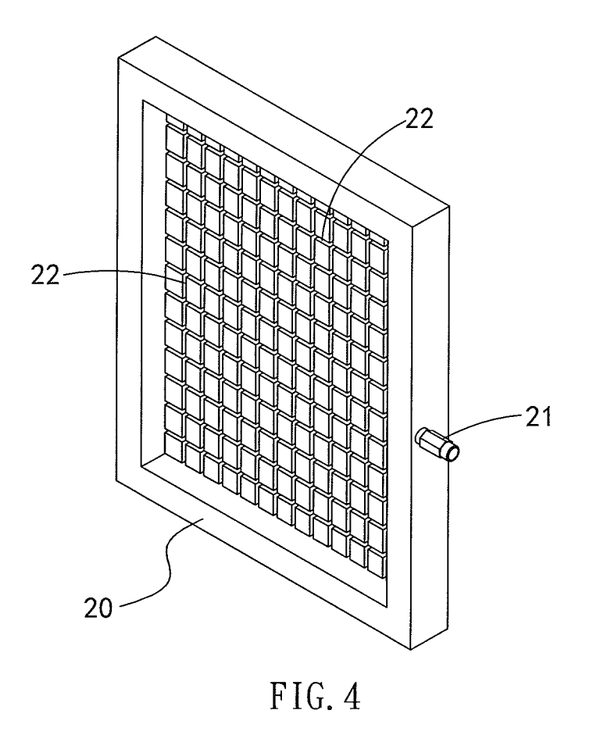
FIG. 4 is another perspective view showing the assembly of the platform of the molding machine for making thermoplastic composites according to the first embodiment of the present invention.
Figure 6:
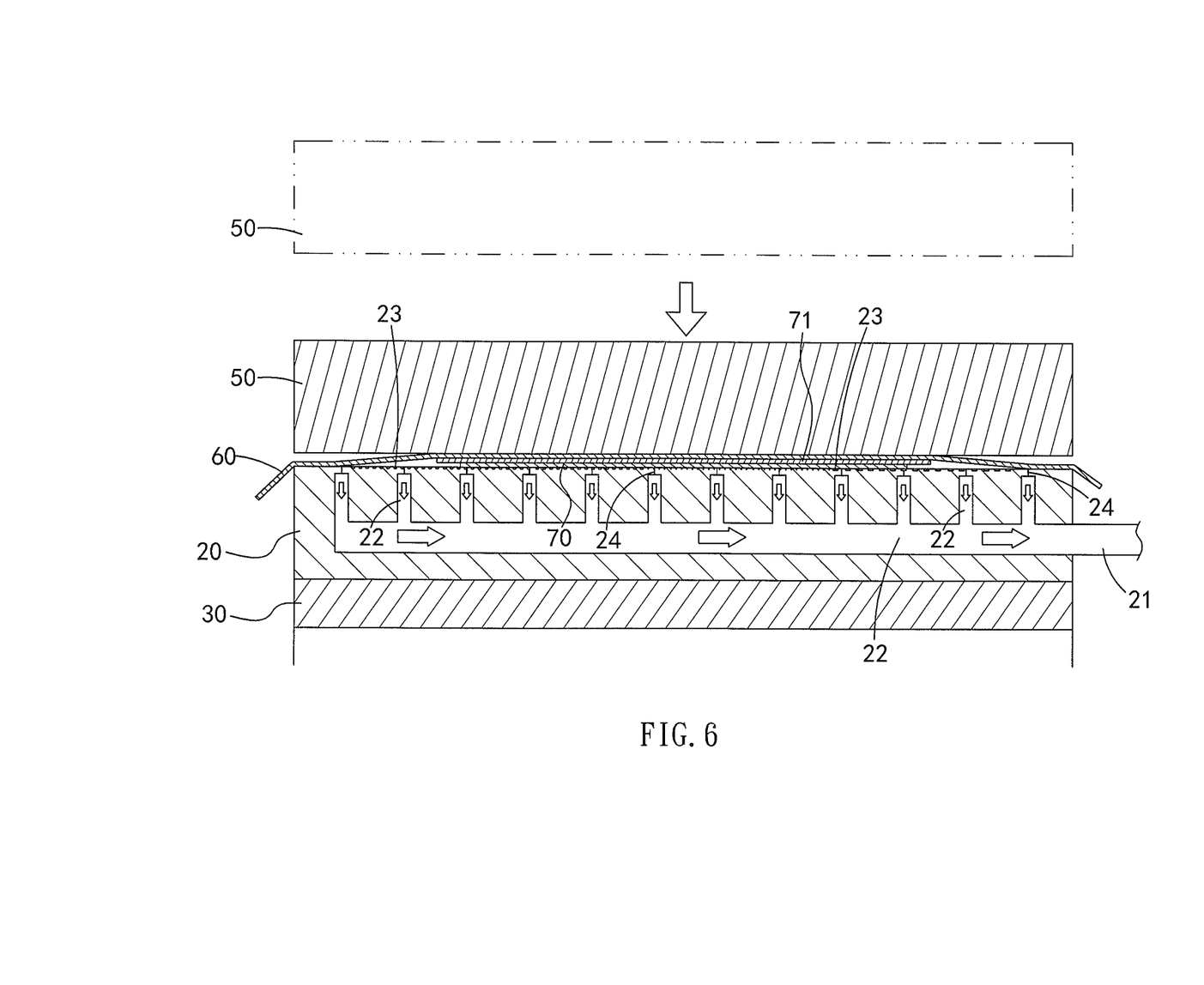
FIG. 6 is a cross sectional view showing the operation of the molding machine for making thermoplastic composites according to the first embodiment of the present invention.

Referring further to FIGS. 3, 4, and 6, the platform 20 includes a plurality of channels 22, and the plurality of channels 22 communicate with each other. The platform 20 includes a curved pattern portion 23 and plural tiny holes 24 which are arranged on the top surface of the platform 20. The curved pattern portion 23 has a pattern or plural patterns and a plurality of separated areas.

A diameter of each tiny hole 24 is at least 0.001 mm. The plurality of tiny holes 24 is arranged on the top surface of the platform 20 and is in communication with the plurality of channels 22. In addition, the connector 21 communicates with the plurality of channels 22, such that air in the plurality of channels 22 is drawn outwardly, so that a negative pressure is produced on the top surface of the platform 20.

Figure 5:
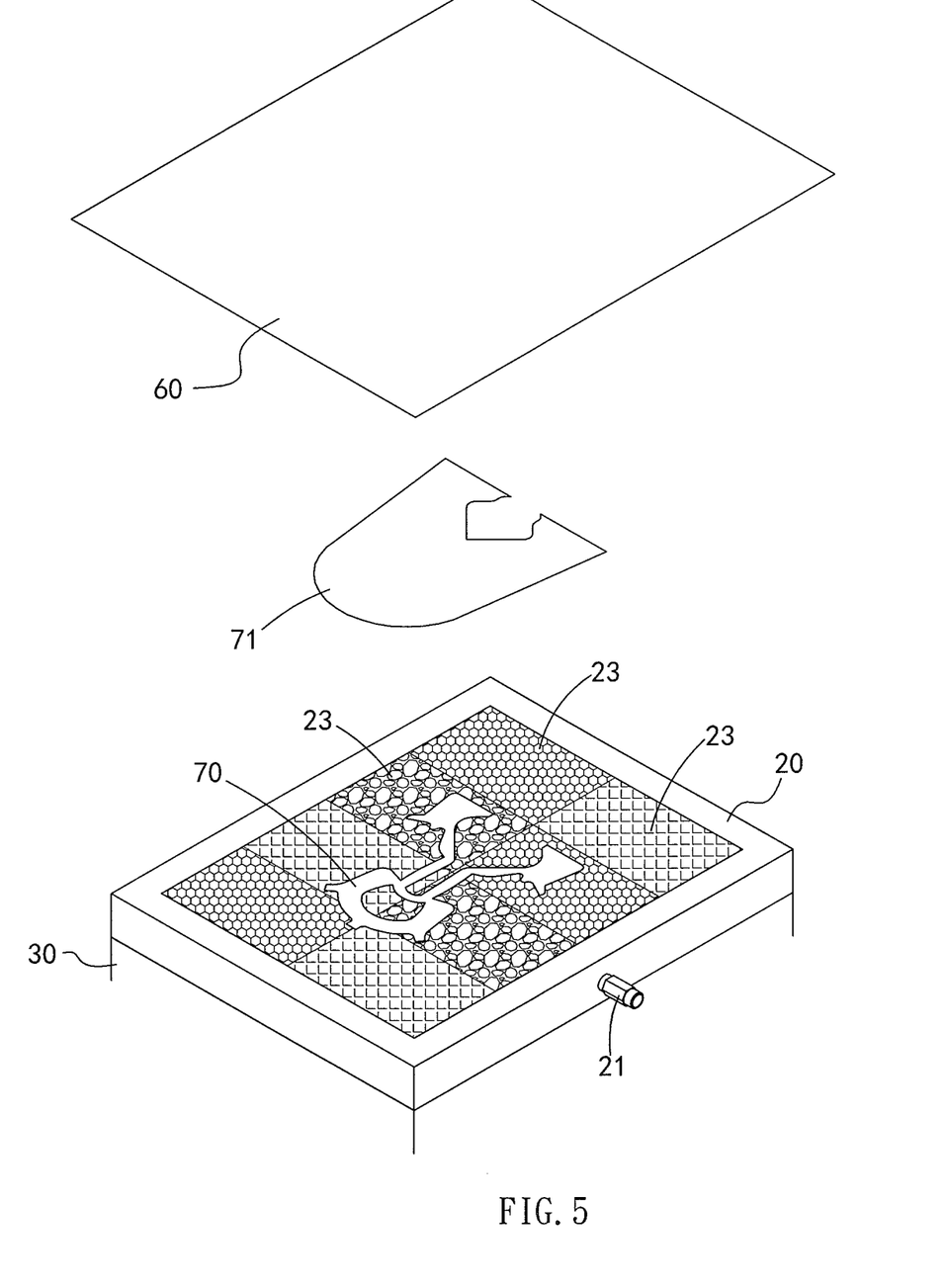
FIG. 5 is a perspective view showing the operation of the molding machine for making thermoplastic composites according to the first embodiment of the present invention.
Figure 7:
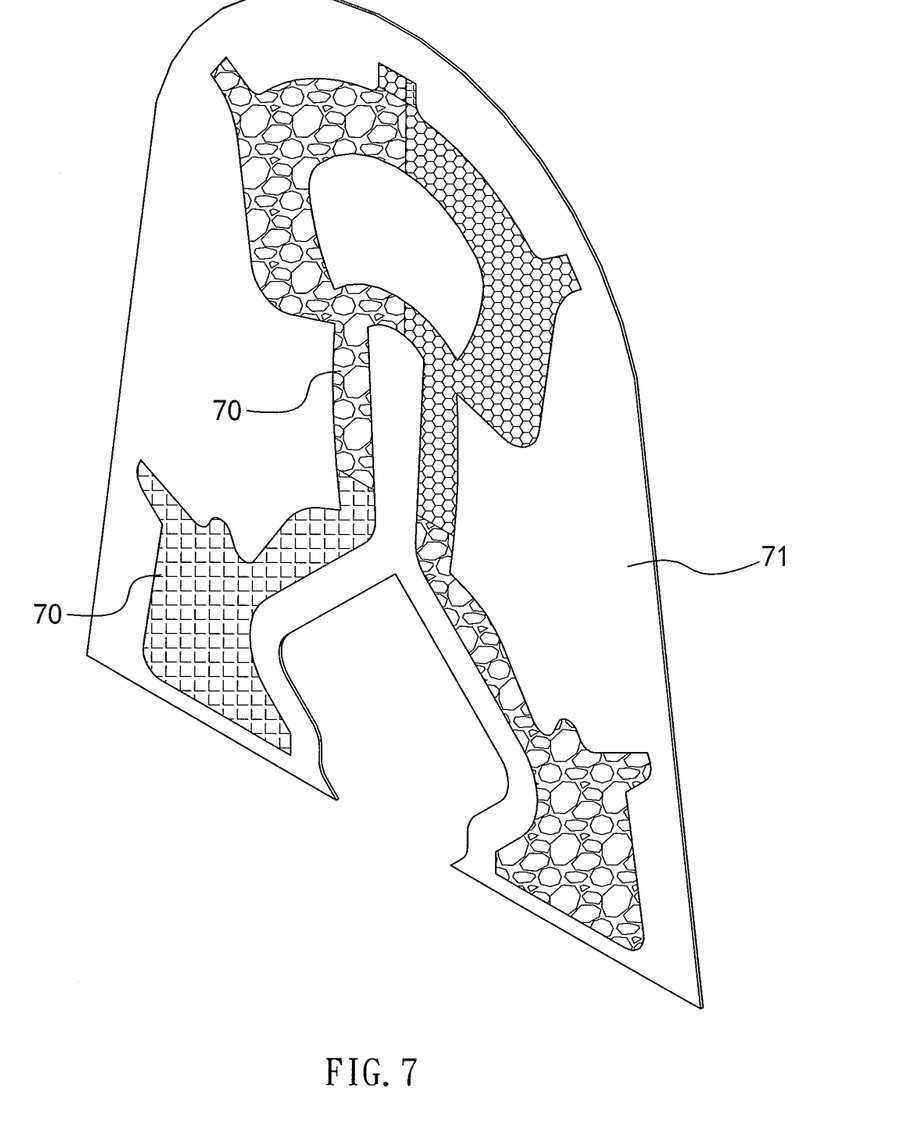
FIG. 7 is a perspective view showing the assembly of thermoplastic composites according to the first embodiment of the present invention.

As shown in FIGS. 5 to 7, the working material includes a thermoplastic film 70 and a cloth material 71. The thermoplastic film 70 has a first side surface and a second side surface, and the first side surface of the thermoplastic film 70 has high temperature resistance higher than that of the second side surface of the thermoplastic film 70. When producing the thermoplastic composite, the thermoplastic film 70 is placed on the top surface of the platform 20, and the first side surface thereof faces downwardly. The cloth material 71 covers the thermoplastic film 70, and the gas barrier film 60 covers the cloth material 71, so that the gas barrier film 60 covers the top surface of the platform 20 completely. Thereafter, the heating device 30 heats the thermoplastic film 70, so that the second side surface of the thermoplastic film 70 and one surface of the cloth material 71 contacting with the thermoplastic film 70 melt, and so that the first side surface of the thermoplastic film 70 softens. The control valve 42 is turned on to drive the vacuum means 40 to draw the air out of the plurality of channels 22 via the pipe 41. Thereafter, the plurality of tiny holes 24 suck the thermoplastic film 70 and the cloth material 71 downwardly, and a negative pressure lower than atmospheric pressure is produced between the top surface of the platform 20 and the gas barrier film 60. Hence, the gas barrier film 60 presses the cloth material 71, and, then, the pressing die 50 moves downwardly so that an upper side of the gas barrier film 60 presses downwardly. Accordingly, a heating process, a pressing process, and a vacuuming process are finished simultaneously to produce thermoplastic composites comprised of the thermoplastic film 70 and the cloth material 71. In addition, the thermoplastic film 70 has three-dimensional patterns formed thereon obviously, and the gas barrier film 60 presses the cloth material 71 tightly without using the pressing die 50.

Figure 8:
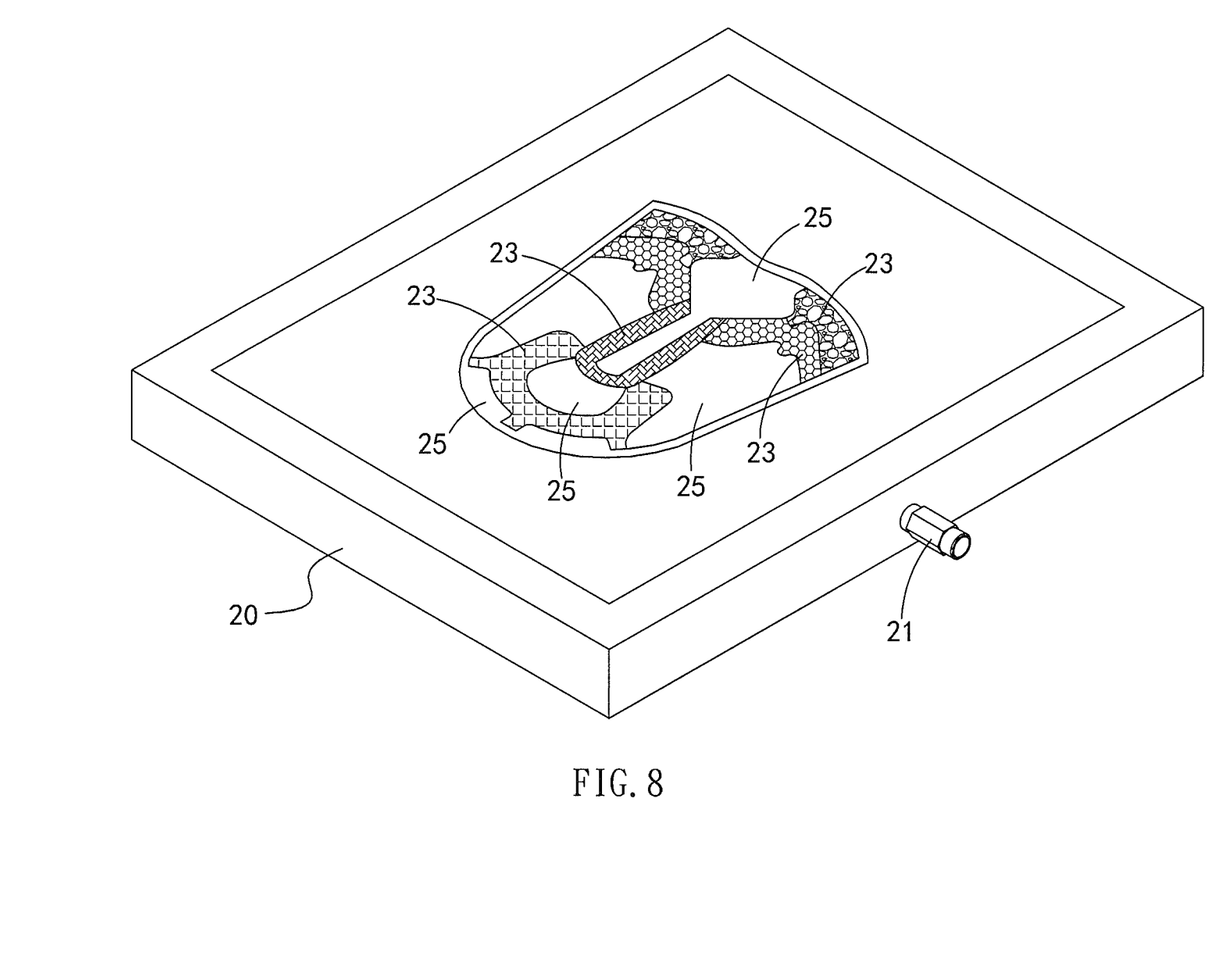
FIG. 8 is a perspective view showing the assembly of a platform of the molding machine for making thermoplastic composites according to a second embodiment of the present invention.

As illustrated in FIG. 8, a molding machine for making thermoplastic composites of a second embodiment from that of the first embodiment contains: a platform 20 including a plurality of forming areas 25 with different depths, and plural curved pattern portions 23 with a plurality of patterns in a plurality of separated areas. The plurality of patterns matches with the plurality of forming areas 25 to produce a working pattern.

Figure 9:
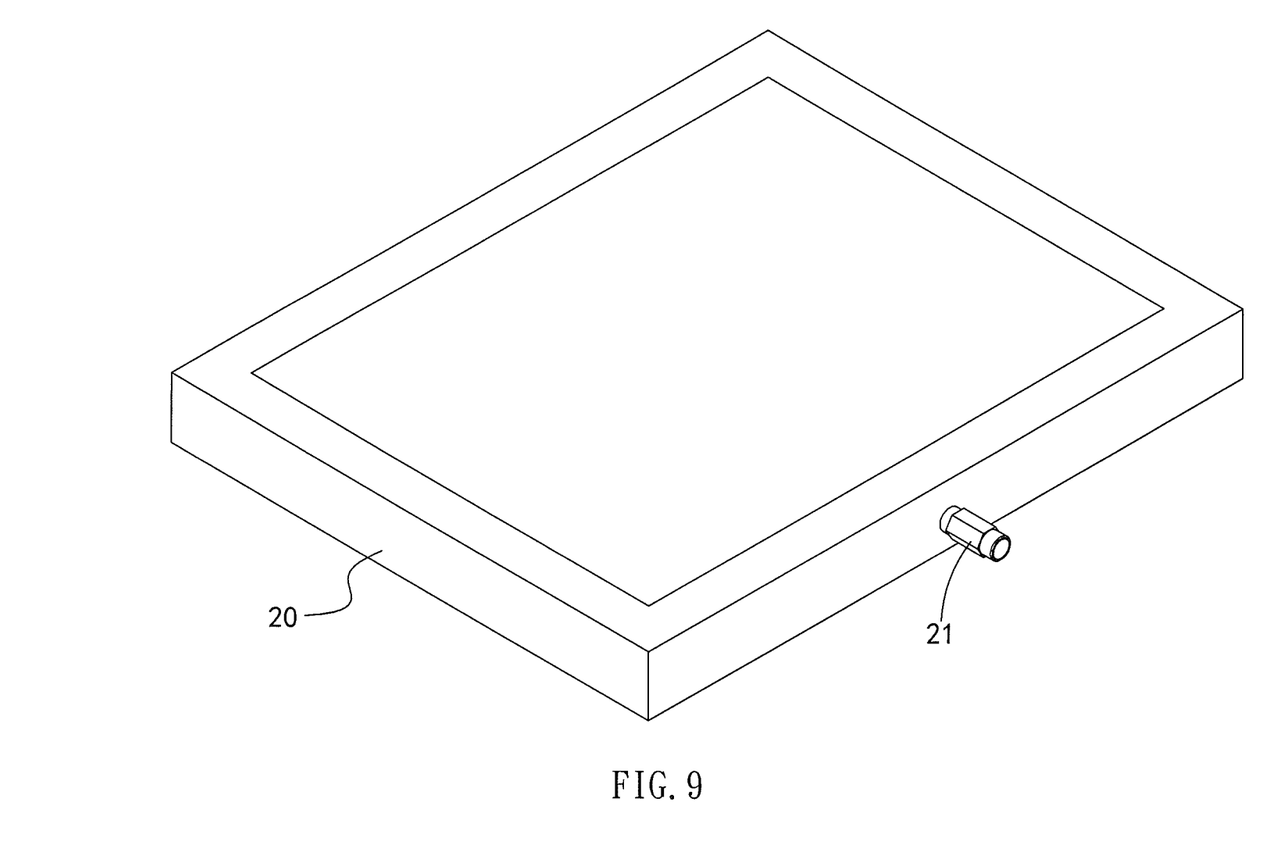
FIG. 9 is a perspective view showing the assembly of a platform of the molding machine for making thermoplastic composites according to a third embodiment of the present invention.

As shown in FIG. 9, a molding machine for making thermoplastic composites of a third embodiment from that of the first embodiment contains: a platform 20 without plural curved pattern portions 23, so the thermoplastic film 70 and the cloth material 71 contact with each other tightly.

Thereby, the thermoplastic composites of the present invention are applied in producing shoes, purses, and hats.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A molding machine for making thermoplastic composites comprising:
   a machine frame including a working stage;
   a platform mounted on the working stage of the machine frame and including a plurality of channels, with the plurality of channels communicating with each other, with the platform including a curved pattern portion and a plurality of tiny holes which are arranged on a top surface of the platform, with the plurality of tiny holes in communication with the plurality of channels, with a connector fixed on one side of the platform and communicating with the plurality of channels;
   a heating device heating a working material on the top surface of the platform;
   a vacuum means arranged in the machine frame and including a pipe coupling with the connector of the platform;
   a gas barrier film being flaky and of a size covering the top surface of the platform on the working stage of the machine frame; and
   a pressing die moving to and pressing the top surface of the platform;
   wherein the gas barrier film is intermediate the top surface of the platform and the pressing die, with the working material intermediate the gas barrier film and the top surface of the platform.

2. The molding machine for making thermoplastic composites as claimed in claim 1, wherein the curved pattern portion has a plurality of patterns.

3. The molding machine for making thermoplastic composites as claimed in claim 1, wherein the platform includes a plurality of forming areas with different depths, wherein the curved pattern portion has a plurality of patterns in a plurality of separated areas, and wherein the plurality of patterns match with the plurality of forming areas to produce a working pattern.

4. A molding machine for making thermoplastic composites comprising:
   a machine frame including a working stage;
   a platform mounted on the working stage of the machine frame and including a plurality of channels and a plurality of tiny holes arranged on a top surface thereof, with the plurality of tiny holes in communication with the plurality of channels, with a connector fixed on one side of the platform and communicating with the plurality of channels;
   a heating device heating a working material on the top surface of the platform;
   a vacuum means arranged in the machine frame and including a pipe coupling with the connector of the platform;
   a gas barrier film being flaky and of a size covering the top surface of the platform; and
   a pressing die moving to and pressing the top surface of the platform;
   wherein the gas barrier film is intermediate the top surface of the platform and the pressing die, with the working material intermediate the gas barrier film and the top surface of the platform.

5. The molding machine for making thermoplastic composites as claimed in claim 4, wherein the pressing die is movably disposed on a C-shaped rack of the machine frame.

6. The molding machine for making thermoplastic composites as claimed in claim 5, wherein the heating device is secured on the platform on the working stage of the machine frame.

7. The molding machine for making thermoplastic composites as claimed in claim 1, wherein the pressing die is movably disposed on a C-shaped rack of the machine frame.

8. The molding machine for making thermoplastic composites as claimed in claim 7, wherein the heating device is secured on the platform on the working stage of the machine frame.

\* \* \* \* \*